Figure 1:
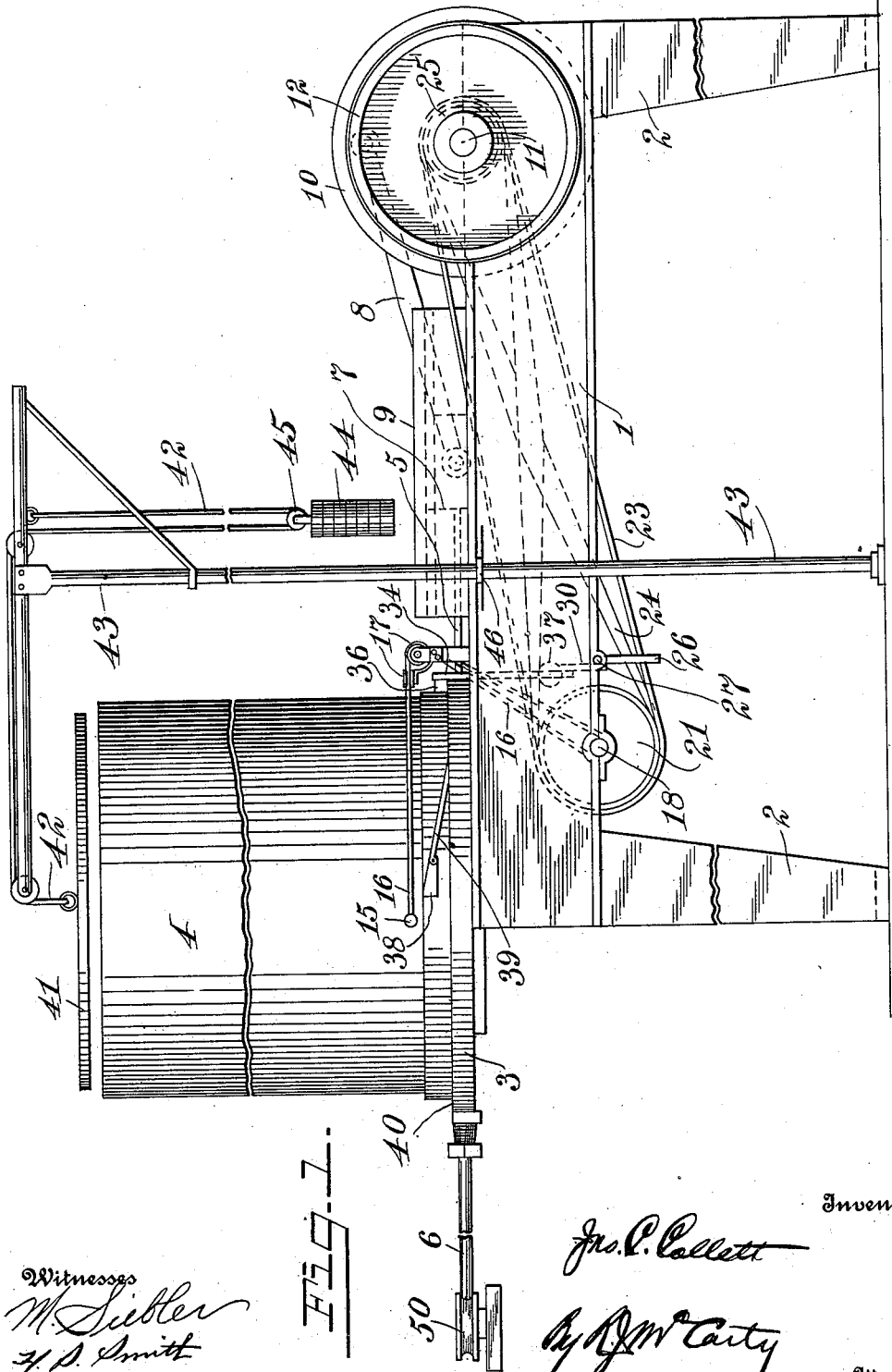

J. C. COLLETT.
HORSE COLLAR STUFFING MACHINE.
APPLICATION FILED JULY 5, 1910.

981,616.

Patented Jan. 17, 1911.
2 SHEETS—SHEET 1.

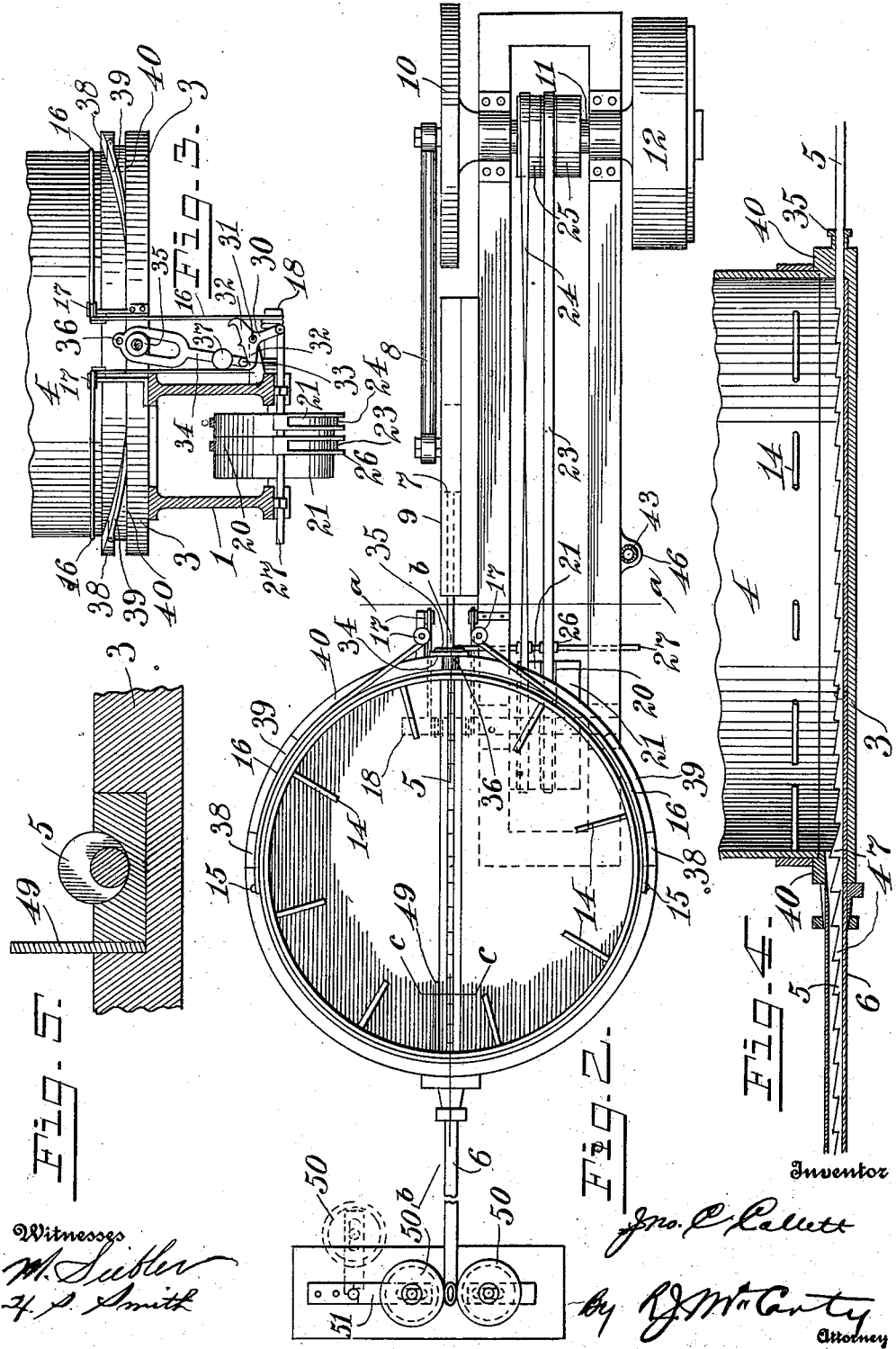

UNITED STATES PATENT OFFICE.

JOHN C. COLLETT, OF DAYTON, OHIO, ASSIGNOR TO THE FOGELSONG MACHINE CO., OF DAYTON, OHIO, A CORPORATION.

HORSE-COLLAR-STUFFING MACHINE.

981,616.  Specification of Letters Patent.  Patented Jan. 17, 1911.

Application filed July 5, 1910. Serial No. 570,233.

*To all whom it may concern:*

Be it known that I, JOHN C. COLLETT, a citizen of the United States, residing at Dayton, in the county of Montgomery and State of Ohio, have invented certain new and useful Improvements in Horse-Collar-Stuffing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for stuffing horse collars.

The object of the invention is to provide a machine of the above type by which long tangled straw or hair, as it comes from the bale, and without any preparation, may be successfully fed and packed in the casing forming the collar. The essential requirements of such a machine are, that the individual strands or lengths of straw shall be presented across the reciprocating feed rod at right angles thereto in order that the feed rod may engage the straw and fold the strands or lengths upon themselves and convey said straw into the casing. Owing to the tangled condition of the straw, the central portion of the hopper must be unobstructed in order that the feed rod may constantly engage the straw, and at the same time it is necessary to constantly agitate the straw in a body. This is best accomplished by imparting to the body of the straw an oscillatory movement, for this reason, namely when the straw oscillates, every strand or length of straw will at some time be presented to the stuffing rod at a direct right angle thereto. Such a presentation of the straw to the stuffing rod permits the stuffing rod to double or fold a strand or length of straw, and to feed the same into the collar, which is highly desirable in high grade collars.

A further object of the invention is to provide an improved form of reciprocating stuffing rod, all as will hereinafter be more fully described in connection with the accompanying drawings.

In the annexed drawings, Figure 1 is a side elevation of my improved collar stuffing machine. Fig. 2 is a top plan view of the same. Fig. 3 is a sectional view on the line *a—a* of Fig. 2. Fig. 4 is a sectional view on the line *b—b* of Fig. 2, with the baffle plate removed. Fig. 5 is a sectional view on the line *c—c* of Fig. 2.

Throughout the specification and drawings, similar reference characters will be found to indicate corresponding parts.

Referring in detail to said drawings, 1 designates the bed or base of the machine, the same being supported on suitable standards 2. On the forward end of said bed is mounted a plate 3 on which the hopper 4 oscillates, said hopper to be again referred to. A stuffing rod 5 reciprocates on the plate 3 and below the hopper, the outer end of said stuffing rod passing into a stuffing tube 6 which extends into the collar or casing to be stuffed and which is not illustrated nor need be further referred to. The rod 5 is reciprocated to engage and feed the straw from the hopper and into the collar, said straw being taken from the bale and placed into the hopper without any assortment or previous preparation.

The following is the operation of the feed rod. The rear end of said rod is attached to a cross-head 7 mounted in guides 9. The cross-head 7 is attached to a connecting rod 8 which in turn is attached to a crank plate 10. The crank plate 10 is mounted on a shaft 11 journaled in the frame 1, and said shaft 11 is provided with a drive pulley 12 by means of which the shaft 11 is rotated and the stuffing rod is reciprocated. The interior of the hopper 4 immediately above the feed rod is provided with a series of laterally extending pins 14 that engage the outer circumference of the body of the straw within the hopper and impart to said body of straw a movement similar to that of the hopper, which is oscillatory. During the reciprocating movement of the stuffing rod 5, the strands or lengths of straw are moved back and forth in a body across the path of the feed rod, and are picked up thereby and folded and fed into the collar casing. In this oscillating movement of the body of straw the individual strands in the mass of straw will be presented in a proper position to the feed rod. In other words, the strands of straw must lie at a right angle to the feed rod before they can be properly engaged and folded by the feed rod and carried into the stuffing tube and casing. This is best accomplished by reversing the movement of the body of straw, first in one direction across the feed rod and then back.

Attached to each side of the hopper at 15, are cables 16 which pass over guide pulleys 17. The ends of the said cables are wound upon a shaft 18, each cable being wound in a different direction. It will therefore be seen that when the shaft 18 is oscillated, a similar movement will be imparted to the hopper 4. The shaft 18 is journaled on the frame 1 and mounted thereon is a tight fitting pulley 20 on each side of which is a loose pulley 21. Extending around pulleys 20 and 21 is a straight belt 23 and a cross belt 24, said belts also extending around a tight pulley 25 on the driving shaft 11. The said belts 23 and 24 are shifted off and on the tight pulley 20 by means of shifters 26 mounted on a rod 27 which is slidingly mounted in the base 1. The rod 27 is attached to an actuator 30 pivoted at 31 and provided with arms 32 extending from each side of the pivot 31. The said arms 32 are adapted to be engaged by the ends 33 of a vertically reciprocating member 34. This member 34 straddles a boss 35 which forms a bearing therefor, and on its upper end it is provided with a roller 36. The said member 34 is also provided with a weight portion 37; it will therefore be seen that when said member 34 is elevated and allowed to fall, the end 33 thereof will engage the actuator 30 and move the same, the direction of movement depending upon the position of said actuator. The arrangement is such that the said actuator 30 is always moved to its opposite position. The member 34 is elevated as follows. On each side of the hopper 4 are two inclined planes 38 which oscillate with the hopper, and are provided with hinged portions or extensions 39. The roller 36, which as before stated is mounted on said member 34, lies in the path of the inclined planes 38, and will ride up said inclined planes during the movement of the hopper in one or the other direction, and will thereby elevate the vertically reciprocating member 34. When the roller 36 reaches the upper end of one or the other of the inclined planes 38, it rides off said incline and permits the member 34 to fall. The end 33 of said member 34 strikes the actuator 30 and changes its position, thereby shifting the belts 23 and 24 and reversing the movement of the hopper. During this reverse movement the roller 36 rides under the incline 38, along a flange 40, the hinged portion 39 allowing said roller to pass under the incline. This operation is the same at each end of the movement of the hopper.

It is desirable that the hopper 4 be provided with a weight 41 which engages the top of the body of straw and presses the same constantly against the feed rod. I find it convenient to attach this weight to a rope or cable 42 which passes over a crane 43 and is provided with a counter weight 44 mounted on a differential pulley 45. When the weight 41 lies within the hopper, the counter weight 44 is removed, but when it is desired to fill the hopper, the weight 44 is placed in position. The crane 43 is pivoted at 46 to the base 1, which connection allows the weight 41 to be swung clear of the hopper.

Referring further to the reciprocating feed rod 5, it will be noted from Fig. 4 that several of the teeth are graduated in sizes above the remaining teeth, such teeth being designated by 47. These larger teeth insure the feed tube 6 being given a maximum supply of stuffing material at each insertion of the feed rod. The largest tooth of the graduated teeth, it will be seen, only enters the mouth of the tube when the feed rod is at the limit of its extreme forward movement. Those teeth immediately in advance of the said larger teeth, being graduated down to the smallest teeth, the result is that the material carried into the tube each time by the larger teeth will not be drawn back out of the tube by the said smaller teeth.

Among the mass of straw or hair as taken from the bale, more or less short lengths will accumulate; to effectively feed and stuff these lengths of straw in making the cheaper grade of collars, I provide a baffle plate 49 mounted along side the feed rod 5 within the hopper, and at the entrance of the stuffing tube 6, see Figs. 2 and 5. This plate 49 forms a pocket which insures the stuffing rod engaging such length of straw in a manner to convey said straw into the stuffing tube and collar. At the outer end of the stuffing tube 6 are mounted sheaves 50 which regulate the thickness of the collar, and to permit the empty casing being easily stretched over the tube 6, one of the sheaves is mounted on a pivotal arm 51. This allows said sheave to be swung away from the tube to the position shown in dotted lines.

Owing to the nature or condition of the straw introduced to the hopper, the central portion of the hopper is not occupied by the pins 14, therefore the straw is not prevented from engaging the feed rod. The pins 14 should be only of sufficient length to enter the surface of the straw far enough to insure a proper engagement thereof.

Having described my invention, I claim:

1. In a machine of the type specified, the combination with a hopper having pins extending laterally from the inner side thereof and adapted to engage the body of straw, of a feed rod below said pins, means for reciprocating said feed rod, and means for oscillating the hopper to cause the pins therein to move the straw back and forth over the feed rod to present the individual strands or lengths of straw in positions at right angles to the plane of the feed rod, substantially as specified.

2. In a machine of the type specified, the combination with a hopper having a series of pins extending laterally from the interior thereof, a feed rod reciprocating below said pins, of an oscillating shaft, flexible connections between said shaft and said hopper, means for oscillating said shaft and therefrom the hopper, and means for reciprocating the feed rod to engage the individual lengths of straw when presented at right angles thereto, substantially as specified.

3. In a machine of the type specified, the combination with an oscillating hopper having a series of pins on the interior thereof, a reciprocating feed rod mounted below said hopper, means for imparting a reciprocating movement to said feed rod, of an oscillating shaft, flexible connections between said hopper and said shaft for imparting an oscillating movement to the hopper, and means having among its members a straight and a cross belt for imparting oscillating movement to said shaft, substantially as specified.

4. In a machine of the type specified, the combination with an oscillating hopper, a feed tube and a stuffing rod below said hopper, and means for reciprocating said rod, of an oscillating member, and flexible connections between the hopper and the said oscillating member for imparting oscillating movement to the hopper to present the individual strands or lengths of the stuffing material at right angles to the stuffing rod, substantially as specified.

In testimony whereof I affix my signature, in presence of two witnesses.

JOHN C. COLLETT.

Witnesses:
R. J. McCarty,
Howard S. Smith.